(12) United States Patent
Kim

(10) Patent No.: US 11,893,954 B2
(45) Date of Patent: Feb. 6, 2024

(54) DISPLAY DEVICE AND METHOD FOR CONTROLLING SAME

(71) Applicant: SAMSUNG ELECTRONICS CO., LTD., Suwon-si (KR)

(72) Inventor: Jinoh Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/104,439

(22) Filed: Feb. 1, 2023

(65) Prior Publication Data

US 2023/0186869 A1  Jun. 15, 2023

Related U.S. Application Data

(63) Continuation of application No. PCT/KR2021/012785, filed on Sep. 17, 2021.

(30) Foreign Application Priority Data

Sep. 18, 2020 (KR) .......................... 10-2020-0120939

(51) Int. Cl.
G09G 3/36 (2006.01)
G02F 1/1362 (2006.01)

(52) U.S. Cl.
CPC ..... *G09G 3/3688* (2013.01); *G02F 1/136286* (2013.01); *G09G 3/3696* (2013.01);
(Continued)

(58) Field of Classification Search
CPC .. G09G 3/3688; G09G 3/3696; G09G 3/3648; G09G 3/3655; G09G 2310/0294; G09G 2310/061; G09G 2310/08; G09G 2320/0247; G09G 2320/0257; G09G 2320/0233; G09G 2320/041;
(Continued)

(56) References Cited

U.S. PATENT DOCUMENTS 4,734,692 A   3/1988 Hosono et al.
5,874,828 A   2/1999 Lee
(Continued)

FOREIGN PATENT DOCUMENTS

JP   2006-330311 A   12/2006
JP   4082282 B2   4/2008
(Continued)

OTHER PUBLICATIONS

Korean Office Action dated Oct. 6, 2023 for KR Application No. 10-2020-0120939.

*Primary Examiner* — David Tung
(74) *Attorney, Agent, or Firm* — Nixon & Vanderhye P.C.

(57) ABSTRACT

A display device may include: a thin film transistor operatively associated with a gate line and a data line; a common electrode line for providing a common voltage to a liquid crystal capacitor and a holding capacitor; and a controller for supplying a data voltage corresponding to a data signal to the liquid crystal capacitor and the holding capacitor through the thin film transistor during an active period, wherein the controller identifies whether a blank period begins and a next data signal is received after a threshold time, and controls the common electrode line to adjust the common voltage on the basis of the identification result.

18 Claims, 10 Drawing Sheets

(52) U.S. Cl.
CPC ............... *G09G 2310/0294* (2013.01); *G09G 2310/061* (2013.01); *G09G 2310/08* (2013.01); *G09G 2320/0247* (2013.01); *G09G 2320/0257* (2013.01); *G09G 2340/0435* (2013.01)

(58) Field of Classification Search
CPC ...... G09G 2340/0435; G02F 1/136286; G02F 1/136213
See application file for complete search history.

(56) References Cited

U.S. PATENT DOCUMENTS

| | | | |
|---|---|---|---|
| 6,392,626 | B1 | 5/2002 | Moon |
| 10,127,882 | B2 | 11/2018 | Kim et al. |
| 10,453,418 | B2 | 10/2019 | Lim et al. |
| 10,565,953 | B2 | 2/2020 | Kim et al. |
| 10,638,086 | B2 | 4/2020 | Ahn et al. |
| 10,902,817 | B2 | 1/2021 | Koo et al. |
| 11,043,184 | B2 | 6/2021 | An et al. |
| 11,158,266 | B2 | 10/2021 | Baek et al. |
| 11,172,160 | B2 * | 11/2021 | Kim ..................... H04N 7/0127 |
| 2004/0113879 | A1 | 6/2004 | Sekiguchi et al. |
| 2005/0285837 | A1 | 12/2005 | Akimoto |
| 2006/0145995 | A1 | 7/2006 | Kim et al. |
| 2007/0052649 | A1 | 3/2007 | Nakajima et al. |
| 2009/0278832 | A1 | 11/2009 | Cho et al. |
| 2011/0298769 | A1 | 12/2011 | Cho et al. |
| 2013/0328952 | A1 | 12/2013 | Bae |
| 2014/0092150 | A1 * | 4/2014 | Slavenburg ............ G09G 5/001 345/698 |
| 2015/0194118 | A1 | 7/2015 | Lee et al. |
| 2016/0351139 | A1 | 12/2016 | Syu et al. |
| 2017/0092197 | A1 * | 3/2017 | Fujimura ............. G09G 3/3258 |
| 2017/0206850 | A1 * | 7/2017 | Kim ..................... G09G 3/3696 |
| 2018/0103231 | A1 * | 4/2018 | Ahn ....................... G09G 5/005 |
| 2019/0206356 | A1 * | 7/2019 | Kim ..................... G09G 3/3607 |
| 2020/0082781 | A1 * | 3/2020 | An ......................... G09G 5/003 |
| 2020/0090596 | A1 | 3/2020 | Oh et al. |
| 2021/0272531 | A1 * | 9/2021 | Shin ..................... G09G 3/3677 |

FOREIGN PATENT DOCUMENTS

| | | |
|---|---|---|
| JP | 4487024 B2 | 6/2010 |
| JP | 4819209 B2 | 11/2011 |
| KR | 10-1986-0008472 A | 11/1986 |
| KR | 20-1993-0000854 Y1 | 2/1993 |
| KR | 10-0188109 B1 | 6/1999 |
| KR | 10-1999-0074553 A | 10/1999 |
| KR | 10-0229622 B1 | 11/1999 |
| KR | 10-0281059 B1 | 2/2001 |
| KR | 10-2003-0056526 A | 7/2003 |
| KR | 10-0463601 B1 | 12/2004 |
| KR | 10-0542309 B1 | 4/2006 |
| KR | 10-2006-0039861 A | 5/2006 |
| KR | 10-0577300 B1 | 5/2006 |
| KR | 10-0687323 B1 | 2/2007 |
| KR | 10-0928485 B1 | 11/2009 |
| KR | 10-1037561 B1 | 5/2011 |
| KR | 10-1055916 B1 | 8/2011 |
| KR | 10-1132122 B1 | 4/2012 |
| KR | 10-1140165 B1 | 4/2012 |
| KR | 10-1157837 B1 | 6/2012 |
| KR | 10-1319339 B1 | 10/2013 |
| KR | 10-1419250 B1 | 7/2014 |
| KR | 10-1523632 B1 | 5/2015 |
| KR | 10-2015-0081848 A | 7/2015 |
| KR | 10-1539028 B1 | 7/2015 |
| KR | 10-1556491 B1 | 10/2015 |
| KR | 10-1569135 B1 | 11/2015 |
| KR | 10-2017-0078051 A | 7/2017 |
| KR | 10-2017-0085648 A | 7/2017 |
| KR | 10-2018-0039232 A | 4/2018 |
| KR | 10-2018-0049332 A | 5/2018 |
| KR | 10-2018-0103209 A | 9/2018 |
| KR | 10-1968848 B1 | 4/2019 |
| KR | 10-2019-0089103 A | 7/2019 |
| KR | 10-2019-0098296 A | 8/2019 |
| KR | 10-2019-0138718 A | 12/2019 |
| KR | 10-2020-0029101 A | 3/2020 |
| KR | 10-2020-0049397 A | 5/2020 |
| WO | WO 2014/042425 A1 | 3/2014 |

* cited by examiner

DISPLAY DEVICE AND METHOD FOR CONTROLLING SAME

CROSS-REFERENCE TO RELATED APPLICATIONS

This application is a continuation of International Application No. PCT/KR2021/012785, filed on Sep. 17, 2021, designating the United States, in the Korean Intellectual Property Receiving Office, and claiming priority to Korean Patent Application No. 10-2020-0120939, filed on Sep. 18, 2020, in the Korean Intellectual Property Office, the disclosures of which are all hereby incorporated by reference herein in their entireties.

BACKGROUND

Field

Certain example embodiments relate to a display device and/or a method for controlling the same, and for example, to a display device which may change a frame rate, and/or a method for controlling the same.

Description of Related Art

A display device of a high scan rate for its improved image quality has been developed and supplied in accordance with the recent development of display device technology.

A conventional display device may be operated by being fixed to an optimal driving timing to prevent or reduce a lower image quality such as flicker, luminance reversal, or afterimage.

The conventional display device may have a fixed frame rate (or scan rate) of a panel, which leads to many constraints such as having to have separate hardware to output an image adapted to various frame rates.

In addition, the conventional display device may have the lower image quality such as luminance change, flicker, or afterimage occurring when driven at a timing of a frame rate other than the optimal driving timing, and a user may thus be provided with no optimal image or only an image at the fixed frame rate.

SUMMARY

Certain example embodiments provide a display device which may output an image by changing a frame rate of a display panel, and/or a method for controlling the same.

According to an example embodiment, a display device may include: a thin film transistor positioned proximate an intersection of a gate line and a data line; a common electrode line providing a common voltage to a liquid crystal capacitor and a holding capacitor; and a controller (comprising processing circuitry) for supplying a data voltage corresponding to a data signal to the liquid crystal capacitor and the holding capacitor through the thin film transistor during an active period, wherein the controller identifies whether a next data signal is received past a threshold time after a blank period begins, and controls the common electrode line to adjust the common voltage on the basis of an identification result.

In addition, the controller may count an elapsed time on the basis of a reference clock when the blank period begins, and control the common electrode line to adjust the common voltage on the basis of the counted elapsed time when the counted elapsed time is longer than the threshold time.

The device may include a memory storing information on a voltage increase/decrease rate for each of a plurality of time periods included in the blank period, wherein the controller obtains a first increase/decrease rate corresponding to a first time period when the counted elapsed time belongs to the first time period among the plurality of time periods, and adjusts the common voltage by applying the obtained first increase/decrease rate to the common voltage.

The controller may obtain a second increase/decrease rate corresponding to a second time period when the counted elapsed time belongs to the second time period among the plurality of time periods as the blank period is maintained, and apply the second increase/decrease rate to the adjusted common voltage.

The voltage increase/decrease rate applied to the common voltage may be increased or decreased in proportion to the elapsed time.

The controller may supply the data voltage corresponding to the next data signal to the liquid crystal capacitor and the holding capacitor through the thin film transistor when the next data signal is received, and reset the increase/decrease rate applied to the common voltage.

The controller may maintain the common voltage when the next data signal is received within the threshold time, and the threshold time may be determined on the basis of a frame rate of the display device.

The controller may adjust at least one of a voltage of the liquid crystal capacitor based on a first common voltage or a voltage of the holding capacitor based on a second common voltage on the basis of the identification result.

Charges accumulated in the liquid crystal capacitor and holding capacitor may be discharged by voltage loss due to distortion of the common voltage and a leakage characteristic of the thin film transistor during the blank period.

According to an example embodiment, a method may be provided for controlling a display device including a thin film transistor positioned at an intersection of a gate line and a data line, and a common electrode line providing a common voltage to a liquid crystal capacitor and a holding capacitor includes: supplying a data voltage corresponding to a data signal to the liquid crystal capacitor and the holding capacitor through the thin film transistor during an active period; and identifying whether a next data signal is received past a threshold time after a blank period begins, and controlling the common electrode line to adjust the common voltage on the basis of an identification result.

The controlling of the common electrode line may include: counting an elapsed time on the basis of a reference clock when the blank period begins; and controlling the common electrode line to adjust the common voltage on the basis of the counted elapsed time when the counted elapsed time is longer than the threshold time.

The display device may include information on a voltage increase/decrease rate for each of a plurality of time periods included in the blank period, and the controlling of the common electrode line may include: obtaining a first increase/decrease rate corresponding to a first time period when the counted elapsed time belongs to the first time period among the plurality of time periods; and adjusting the common voltage by applying the obtained first increase/decrease rate to the common voltage.

The controlling of the common electrode line may include: obtaining a second increase/decrease rate corresponding to a second time period when the counted elapsed time belongs to the second time period among the plurality of time periods as the blank period is maintained; and applying the second increase/decrease rate to the adjusted common voltage.

The voltage increase/decrease rate applied to the common voltage may be increased or decreased in proportion to the elapsed time.

The method may include: supplying the data voltage corresponding to the next data signal to the thin film transistor through the data line when the next data signal is received; and resetting the increase/decrease rate applied to the common voltage.

The controlling of the common electrode line may include maintaining the common voltage when the next data signal is received within the threshold time, and the threshold time may be determined on the basis of a frame rate of the display device.

The controlling of the common electrode line may include adjusting at least one of a voltage of the liquid crystal capacitor based on a first common voltage or a voltage of the holding capacitor based on a second common voltage on the basis of the identification result.

Charges accumulated in the liquid crystal capacitor and holding capacitor may be discharged by voltage loss due to distortion of the common voltage and a leakage characteristic of the thin film transistor during the blank period.

According to the various example embodiments, the display panel may be driven at the plurality of frame rates without significantly changing the panel structure of the display device.

BRIEF DESCRIPTION OF DRAWINGS

The above and other aspects, features, and advantages of certain example embodiments of the present disclosure will be more apparent from the following detailed description, taken in conjunction with the accompanying drawings, in which.

DETAILED DESCRIPTION

Figure 1:
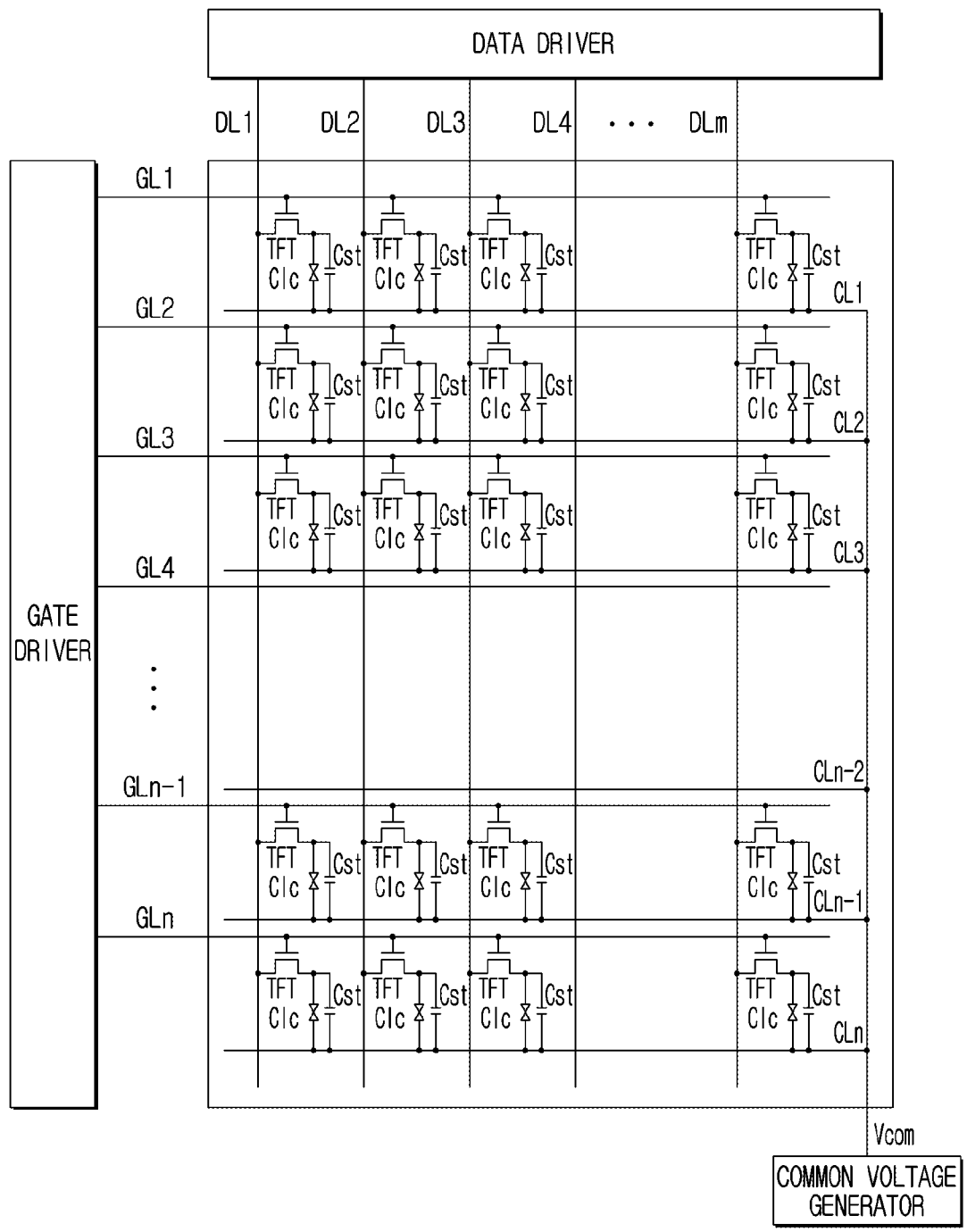
FIG. 1 is a view for explaining a configuration of a display device according to an example embodiment.

Hereinafter, example embodiments are described in detail with reference to the accompanying drawings.

General terms that are currently widely used were selected as terms used in embodiments of the present disclosure in consideration of their functions in the present disclosure, and may be changed based on the intentions of those skilled in the art or a judicial precedent, the emergence of a new technique, and the like. In addition, in a specific case, terms arbitrarily chosen by an applicant may exist. In this case, the meanings of such terms are mentioned in detail in corresponding description portions of the present disclosure. Therefore, the terms used in the present disclosure need to be defined on the basis of the meanings of the terms and the contents throughout the present disclosure rather than simple names of the terms.

In the present disclosure, an expression "have," "may have," "include," "may include" or the like, indicates the existence of a corresponding feature (for example, a numerical value, a function, an operation or a component such as a part), and does not exclude the existence of an additional feature.

An expression, "at least one of A or/and B" may indicate either "A or B," or "both of A and B."

Expressions "first," "second," or the like, used in the present disclosure may indicate various components regardless of a sequence and/or importance of the components. These expressions are used only to distinguish one component from the other components, and do not limit the corresponding components.

In case that any component (for example, a first component) is mentioned to be "(operatively or communicatively) coupled with/to" or "connected to" another component (for example, a second component), it is to be understood that the any component may be directly coupled to the another component or may be coupled to the another component through still another component(s) (for example, a third component).

A term of a singular number may include its plural number unless explicitly represented otherwise in the context. It is to be understood that a term "include," "formed of," or the like used in the present application specifies the presence of features, numerals, steps, operations, components, parts, or combinations thereof, which is mentioned in the specification, and does not preclude the presence or addition of one or more other features, numerals, steps, operations, components, parts, or combinations thereof.

In the present disclosure, a "module" or a "~er/~or" may perform at least one function or operation, and be implemented by hardware, software, or a combination of hardware and software. In addition, a plurality of "modules" or a plurality of "~ers/~ors" may be integrated in at least one module and implemented by at least one processor (not shown) except for a "module" or a "~er/or" that needs to be implemented by specific hardware. Thus, each "module" herein may comprise circuitry.

In the specification, such a term as "user" may refer to a person who uses an electronic device or a device (e.g., an artificial intelligence electronic device) which uses an electronic device.

Hereinafter, example embodiments are described in more detail with reference to the accompanying drawings.

FIG. 1 is a view for explaining a configuration of a display device according to an example embodiment.

As shown in FIG. 1, a display device 100 according to an example embodiment may include a liquid crystal panel, a gate driver, a data driver, and a common voltage generator.

Referring to FIG. 1, the liquid crystal panel may include a plurality of liquid crystal cells arranged in a matrix type, the gate driver may be connected, directly or indirectly, to a plurality of gate lines GL1 to GLn of the liquid crystal panel, and the data driver may be connected, directly or indirectly, to a plurality of data lines DL1 to DLm of the liquid crystal panel.

The plurality of liquid crystal cells may each be connected, directly or indirectly, to a transistor (e.g., thin film transistor (TFT)) positioned at an intersection of the gate line and the data line and a common electrode line providing a common voltage Vcom.

According to an embodiment, a gate of the thin film transistor may be connected, directly or indirectly, to the gate line, a source may be connected, directly or indirectly, to the data line, and a drain may be simultaneously connected, directly or indirectly, to one electrode of a liquid crystal capacitor $C_{lc}$ and that of a holding capacitor $C_{st}$. According to an embodiment, the liquid crystal capacitor may be an equivalent representation of a liquid crystal material formed between a pixel electrode Vp and a common electrode Vcom, and a holding capacitor may be formed between the pixel electrode and the common electrode. Meanwhile, for convenience of explanation, FIG. 1 assumes and shows a case where the common electrode is connected, directly or indirectly, to each of the liquid crystal capacitor and the holding capacitor. However, a first common electrode may be connected, directly or indirectly, to the liquid crystal capacitor and a second common electrode may be connected, directly or indirectly, to the holding capacitor. Here, the first common electrode and the second common electrode refer to different electrodes.

According to an embodiment, a gate voltage applied to the gate line may have a turn-on period and a turn-off period that are periodically repeated, and the thin film transistor may be turned on during the turn-on period. Here, when the thin film transistor is turned on, a data voltage corresponding to a data signal may be supplied to the thin film transistor, and the data voltage may thus be applied to the pixel electrode. Here, the data voltage may indicate a pixel voltage or a grayscale voltage, and for convenience of explanation, this voltage is collectively referred to as the data voltage.

Meanwhile, an electric field corresponding to a difference between the data voltage and the common voltage Vcom may be applied to the liquid crystal panel, and light may be transmitted with a transmittance corresponding to the electric field.

According to an embodiment, the liquid crystal panel may display an image by inputting the data signal based on valid image data to the liquid crystal panel during an active period (or active time) when the data voltage is applied.

Meanwhile, a blank period (or blank time) when no valid image data is applied may be defined between the active periods. The blank period (or blank time) when no data voltage is applied may indicate a period in which an image corresponding to a previous data signal is maintained until a data voltage corresponding to a next data signal is supplied. According to an embodiment, the holding capacitor $C_{st}$ may be accessorily used to maintain the data voltage (e.g., pixel voltage) for one frame. According to an embodiment, charges accumulated in the thin film transistor may be discharged by the data voltage supplied to the thin film transistor during the blank period.

Meanwhile, a conventional display device may have a liquid crystal panel fixed to be operated only at a specific frame rate. Here, the frame rate may indicate a speed at which the display device displays one frame. The frame rate of the liquid crystal panel may be referred to as a screen refresh rate, a frequency, or a scan rate, and is hereinafter collectively referred to as the frame rate for convenience of explanation. The frame rate may be expressed in units of Hz.

For example, when the frame rate is 60 Hz, the liquid crystal panel may provide 60 frames per second. For another example, when the frame rate is 120 Hz, the liquid crystal panel may provide 120 frames per second.

According to an embodiment, when the frame rate of the liquid crystal panel is 60 Hz, a time of 1/60 s displaying one frame may include the active period in which the valid image data is applied and the blank period in which no valid image data is applied. Conventionally, the frame rate of the liquid crystal panel may be fixed, and the active period and the blank period may thus also be fixed.

Unlike the conventional display device, the display device 100 according to various examples may be variably driven at any one frame rate among the plurality of frame rates. Hereinafter, the description describes a method of minimizing or reducing a lower screen quality such as flicker or afterimage by variably changing the active period and the blank period and dynamically changing the common voltage Vcom as the display device 100 is operated at the various frame rates.

Meanwhile, the active period may be referred to as a display area or a display period, and the blank period may be referred to as a non-display area or a non-display period. However, these periods are hereinafter collectively referred to as the active period and the blank period, respectively, for convenience of explanation.

Hereinafter, the description describes a method of providing the image corresponding to each of the plurality of frame rates without the lower image quality such as the flicker or the afterimage by fixing the active period and varying the blank period according to various embodiments.

Figure 2:
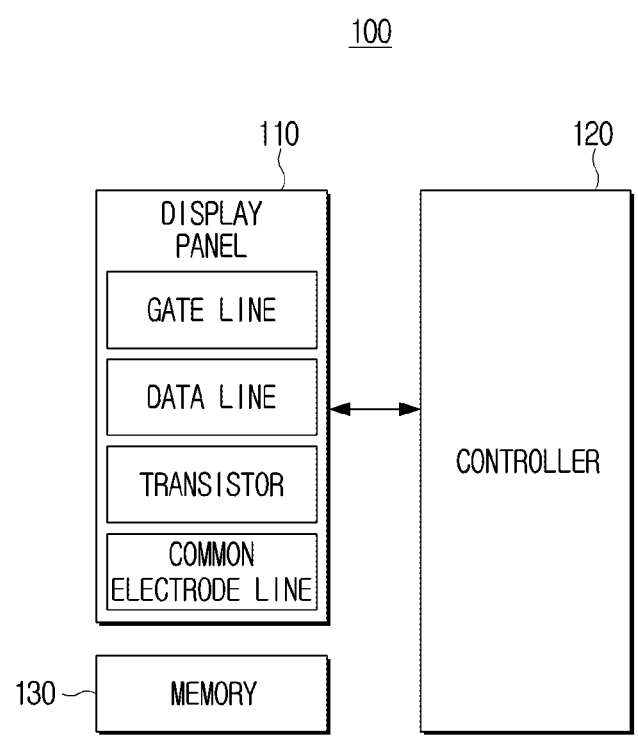
FIG. 2 is a block diagram for explaining a detailed configuration of the display device according to an example embodiment.

FIG. 2 is a block diagram for explaining a detailed configuration of the display device according to an example embodiment.

Referring to FIG. 2, the display device 100 according to an example embodiment may include a display panel 110, a controller 120, and a memory 130.

The display device 100 according to an embodiment may be implemented as a television (TV), and is not limited thereto. The display device 100 may be applied to any device having a display function without limitation such as a video wall, a large format display (LFD), a digital signage, a digital information display (DID), or a projector display. In addition, the display panel 110 may be implemented as a display panel of various types such as a liquid crystal display (LCD), an organic light-emitting diode (OLED), a liquid crystal on silicon (LCoS), a digital light processing (DLP), a quantum dot (QD), a quantum dot light-emitting diodes (QLED), a micro light-emitting diode (μLED) or mini LED.

Meanwhile, as shown in FIG. 1, the display panel 110 may include the plurality of gate lines, the plurality of data lines, the thin film transistor positioned at the intersection of the gate line and the data line, and the common electrode line for providing the common voltage. According to an embodiment, the common electrode line may provide the common voltage to the liquid crystal capacitor and the holding capacitor. For example, the common electrode line may provide the plurality of common voltages to the liquid crystal capacitor and the holding capacitor, respectively. For example, the common electrode line may provide the first common voltage (e.g., Vcom) to the liquid crystal capacitor, and provide the second common voltage (e.g., $V_{cst}$) to the holding capacitor.

The display device 100 according to an example embodiment may be implemented as a touch screen combined with a touch sensor, a flexible display, a rollable display, a three-dimensional (3D) display, a display in which a plurality of display modules are physically connected with each other, or the like.

The controller 120 may control overall operations of the display device 100.

The controller 120 according to an embodiment may be implemented as a digital signal processor (DSP) that processes a digital image signal, a microprocessor, an artificial intelligence (AI) processor or a timing controller (T-CON). However, the controller 120 is not limited thereto, and may include one or more of a central processing unit (CPU), a micro controller unit (MCU), a micro processing unit (MPU), a controller, an application processor (AP), a communication processor (CP), and an ARM processor, or may be defined by these terms. In addition, the controller 120 may be implemented by a system-on-chip (SoC) or a large scale integration (LSI) in which a processing algorithm is embedded, or may be implemented in a field programmable gate array (FPGA). Each "processor" herein comprises processing circuitry.

The controller 120 according to an example embodiment may supply the data voltage corresponding to the data signal to the thin film transistor through the data line during the active period. That is, the controller 120 may apply the valid image data to the liquid crystal cell during the active period. Meanwhile, the data signal may indicate one frame data signal, which is an example, and the data signal is not limited thereto. For example, one frame may be divided into a plurality of blocks, and the data signal may indicate a signal corresponding to a predetermined number of blocks among the plurality of blocks.

Figure 3:
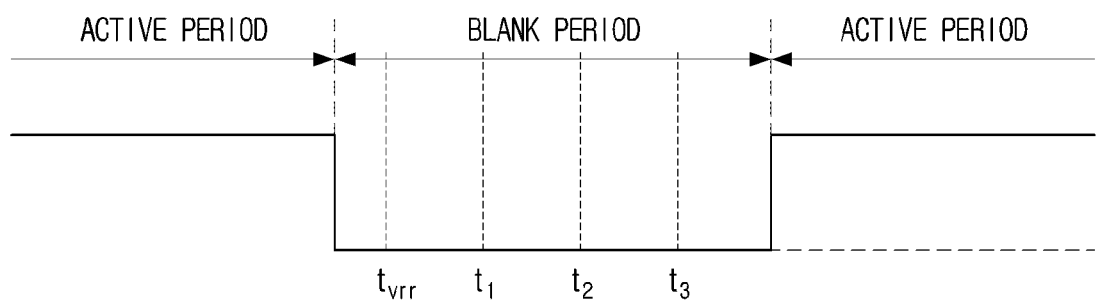
FIG. 3 is a view for explaining an active period and a blank period according to an example embodiment.

FIG. 3 is a view for explaining the active period and the blank period according to an example embodiment.

The controller 120 according to an example embodiment may identify whether the next data signal is received past a threshold time after the blank period in which no valid image data is applied begins. The controller 120 may then control the common electrode line to adjust the common voltage Vcom on the basis of an identification result. Meanwhile, the common voltage may be referred to as a counter electrode voltage, and is collectively referred to as the common voltage for convenience of explanation.

The conventional display device may have the fixed frame rate, and the active period and blank period may thus be fixed. The display device 100 according to an example embodiment may be operated by changing the frame rate, and the active period and the blank period may thus also be changed.

The display device 100 according to various examples may output the image in compliance with a calculation result (e.g., frame rate of the image) of a calculation device (e.g., graphics card) without the lower image quality such as the flicker or the afterimage, and eliminate screen tearing by corresponding to various adaptive synchronization technologies such as AMD's Free Sync™ and Nvidia's G-Sync™.

Referring to FIG. 3, the display device 100 according to an example embodiment may define the blank period as a period up to a first time period $t_1$ or up to a second time period $t_2$, following the active period. FIG. 3 shows only a threshold time $t_{vrr}$ and the first to third time periods $t_1$ to $t_3$ for convenience of explanation. However, the blank period may be defined as a period up to an n-th time period $t_n$ after the active period.

For convenience of explanation, the description assumes and describes a case where the display device 100 is operated at a specific frame rate.

In this case, the controller 120 may identify whether the next data signal is received past the threshold time $t_{vrr}$ after the blank period begins following the active period. Here, the threshold time $t_{vrr}$ may be determined on the basis of the specific frame rate. For example, the display device 100 may include the display panel 110 operated at a frame rate of 120 Hz, and in this case, the controller 120 may identify whether the next data signal is received within the threshold time $t_{vrr}$ after the active period. Here, the sum of the active period and the threshold time $t_{vrr}$ may be 1/120 s.

According to an embodiment, the controller 120 may determine that the frame rate is not changed when the next data signal is received within the threshold time $t_{vrr}$.

Figure 4:
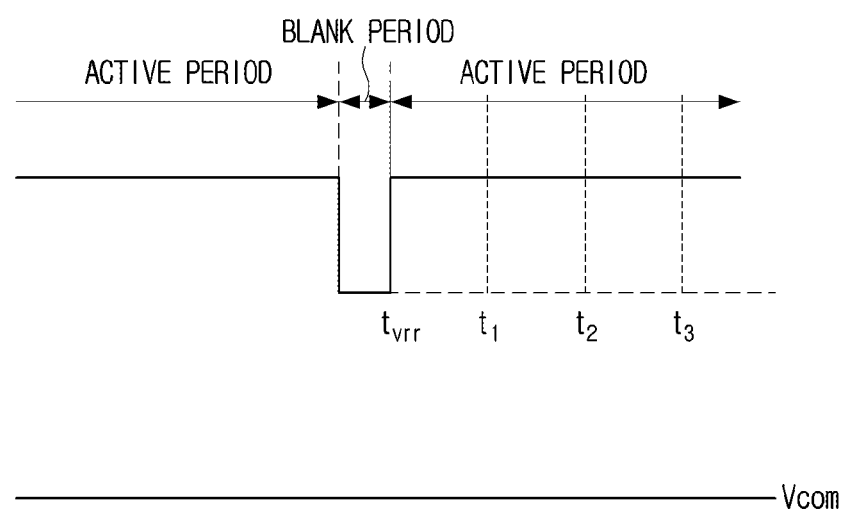
FIG. 4 is a view for explaining a plurality of time periods and a common voltage according to an example embodiment.

The description describes this configuration in detail with reference to FIG. 4.

Referring to FIG. 4, the controller 120 according to an example embodiment may determine that the frame rate is not changed when the next data signal is received within the threshold time $t_{vrr}$, following the data signal, and maintain the common voltage.

The active period may then begin after the threshold time $t_{vrr}$, and the controller 120 may apply the valid image data corresponding to the received next data signal to the liquid crystal panel. That is, the controller 120 may supply the data voltage corresponding to the next data signal to the thin film transistor through the data line.

During the blank period, charges accumulated in the capacitor via the thin film transistor may be discharged by the data voltage, and that is, loss due to voltage discharge may occur. In the display device 100, an optimal common voltage corresponding to the frame rate of the display device 100 may be set in consideration of the loss due to the voltage discharge during the blank period to prevent or reduce the lower image quality phenomena such as the flicker or the afterimage. The description describes this configuration in detail with reference to FIG. 5.

Figure 5:
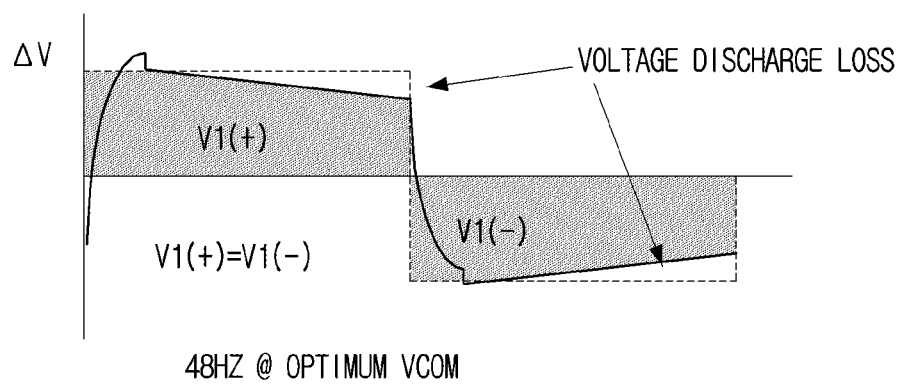
FIG. 5 is a view for explaining an optimal common voltage according to an example embodiment.
Figure 5:
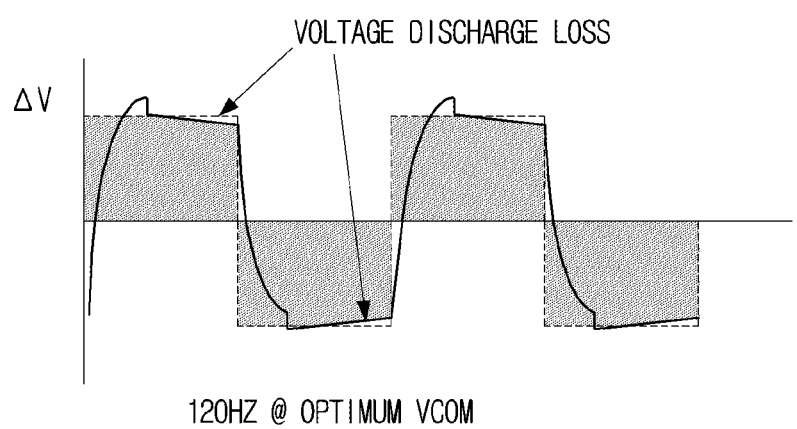

FIG. 5 is a view for explaining the optimal common voltage according to an example embodiment.

Referring to FIG. 5, the thin film transistor of the liquid crystal display may be deteriorated such as having ion stacking when the electric field is continuously applied in the same direction due to its characteristic. It is thus necessary to drive the display by inverting polarity of the data voltage (e.g., pixel voltage or grayscale voltage) based on the common electrode in units of frames. For example, when polarity of a voltage applied to one liquid crystal cell is positive (+), the polarity of the voltage applied to the liquid crystal cell based on the next data signal needs to be negative (−). That is, the data voltage may be positive (+) or negative (−) based on the common electrode.

Meanwhile, an effective value of the voltage actually applied to the liquid crystal cell may be determined by a voltage magnitude between the data voltage and the common voltage Vcom. Here, the voltage magnitude of the positive polarity (+) and negative polarity (−) may be symmetrical to each other, thereby preventing or reducing the lower image quality phenomenon such as the flicker or the afterimage.

The conventional display device may have the fixed active and blank periods in consideration of only a case where the device is operated at the specific frame rate. In addition, the conventional display device may be operated with the optimal common voltage set to prevent or reduce the lower image quality on the basis of the loss due to the voltage discharge during the fixed blank period.

For example, referring to FIG. 5, the conventional display device may be operated at a frame rate of 48 Hz, and in this case, the optimal common voltage corresponding thereto may be predetermined. For another example, the conventional display device may be operated at a frame rate of 120 Hz, and in this case, the optimal common voltage corresponding thereto may be predetermined.

As in an example embodiment, the display device 100 may appropriately adjust (e.g., increase or decrease) the common voltage to prevent or reduce the lower image quality while outputting the image of various frame rates. The description describes this configuration in detail with reference to FIG. 6.

Figure 6:
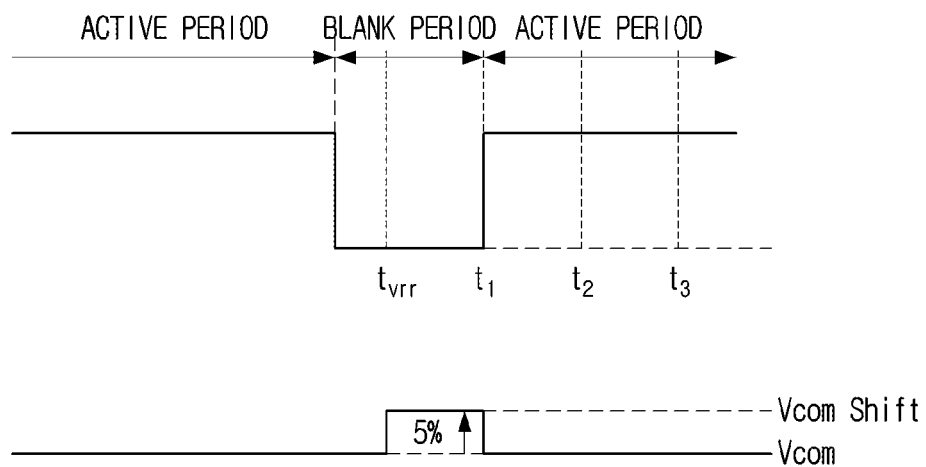
FIG. 6 is a view for explaining an adjusted common voltage according to an example embodiment.

FIG. 6 is a view for explaining the adjusted common voltage according to an example embodiment.

Referring to FIG. 6, the controller 120 according to an example embodiment may count an elapsed time on the basis of a reference clock when the blank period begins. The controller 120 may then control the common electrode line to adjust the common voltage on the basis of the counted elapsed time. According to an embodiment, the controller 120 may also count the elapsed time on the basis of the reference clock when the active period begins. That is, a reference for counting the elapsed time may be after the blank period begins or after the active period begins. Meanwhile, the reference clock may be a clock based on an operating frequency of the display device 100. For example, the reference clock may indicate a scan time for scanning each of a plurality of pixel lines included in the display panel 110 in the active period. However, this configuration is only an example, and may not be limited thereto.

According to an embodiment, the controller 120 may obtain a first increase/decrease rate corresponding to the first time period $t_1$ when the counted elapsed time is longer than the threshold time $t_{vrr}$ after the active period (e.g., a time point at which the active period ends). The controller 120 may then adjust the common voltage by applying the obtained first increase/decrease rate to the common voltage.

Referring to FIG. 6, a case where the next data signal is not received within the threshold time $t_{vrr}$ may be a case where an image of a frame rate different from that of the display device 100 is received. For example, the display device 100 may have the frame rate of 120 Hz. In this case, the blank period may become longer because no valid image data is received when the next data signal is not received after the blank period (e.g., threshold period $t_{vrr}$ corresponding to the frame rate of 120 Hz.

The conventional display device may have increased voltage distortion of the common electrode and the rapidly lower luminance due to the voltage discharge when the blank period becomes longer as the frame rate of the image is changed (for example, when the elapsed time counted after the active period is longer than the threshold time $t_{vrr}$). Accordingly, the conventional display device 100 may apply the electric field corresponding to the difference between the data voltage corresponding to the next data signal and the common voltage Vcom to the liquid crystal without compensating for the increased voltage loss during the blank period. As a result, the flicker may occur due to a gradually increased or decreased luminance, and the lower image quality phenomenon such as image distortion or the after-image may occur in a severe case.

According to an example embodiment, the controller 120 may determine that the frame rate is changed in a case where the next data signal is not received within the threshold time $t_{vrr}$ after the blank period begins following the active period. The controller 120 may then adjust (for example, increase or decrease) the common voltage to compensate for the voltage loss due to the voltage distortion of the common electrode that is increased as the blank period becomes longer.

Meanwhile, the display device 100 according to an example embodiment may include the memory 130 storing information on a voltage increase/decrease rate for each of a plurality of time periods included in the blank period.

For example, as shown in FIG. 3, the display device 100 may include the memory 130 storing information on the voltage increase/decrease rate from the threshold time $t_{vrr}$ to the first time period $t_1$ after the blank period begins, information on the voltage increase/decrease rate from the first time period $t_1$ to the second time period $t_2$, and information on the voltage increase/decrease rate from the second time period $t_2$ to the third time period $t_3$.

According to an embodiment, the controller 120 may count the elapsed time on the basis of the reference clock as soon as the blank period begins, and adjust the common voltage by applying the first increase/decrease rate corresponding to the first time period to the common voltage when the counted elapsed time belongs to the first time period $t_1$ from the threshold time $t_{vrr}$. Meanwhile, a time point at which the controller 120 counts the elapsed time may not be limited to a time point after the blank period begins, and the controller 120 may count the elapsed time on the basis of the reference clock at the same time as the active period begins. In this case, the threshold time $t_{vrr}$ described above may be increased in consideration of the active period.

Meanwhile, as shown in FIG. 6, as the next data signal is received, the blank period may be defined as a period up to the first time period $t_1$, and the active period may then begin again. However, the next data signal may not be received and the blank period may thus be maintained more. The description describes this example with reference to FIG. 7.

Figure 7:
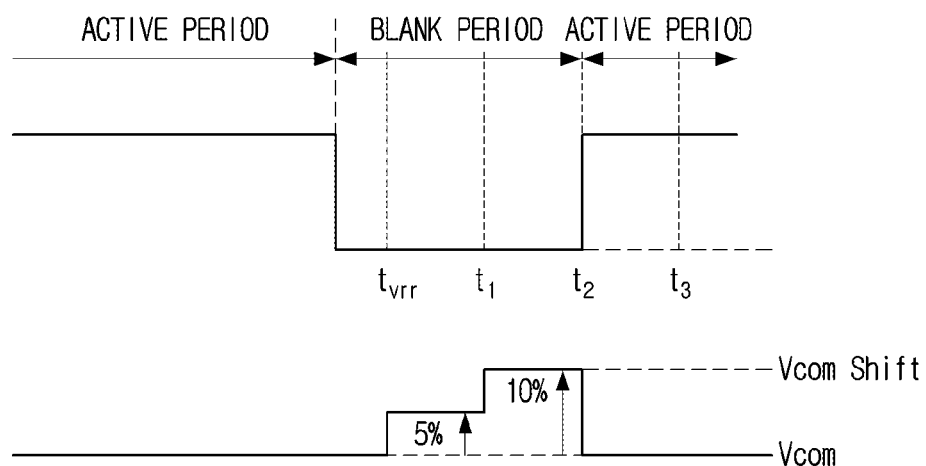
FIG. 7 is a view for explaining the adjusted common voltage according to another example of present disclosure.

FIG. 7 is a view for explaining the adjusted common voltage according to another example.

Referring to FIG. 7, the controller 120 may obtain a second increase/decrease rate corresponding to the second time period when the counted elapsed time belongs to the second time period among the plurality of time periods as the blank period is maintained.

For example, the voltage loss due to the voltage distortion of the common electrode may be increased as the blank period becomes longer when the next data signal is not received after the first time period $t_1$.

The controller 120 according to an example embodiment may apply the obtained second increase/decrease rate to the adjusted common voltage. For example, the controller 120 may apply the second increase/decrease rate to the common voltage to which the first increase/decrease rate is previously applied in the first time period $t_1$.

FIGS. 6 and 7 assume and show that the first increase/decrease rate corresponding to the first time period $t_1$ corresponds to 5% and the second increase/decrease rate corresponding to the second time period $t_2$ corresponds to 10%, for convenience of explanation. However, these rates are only examples and are not limited thereto. For example, the voltage increase/decrease rate for each of the plurality of time periods may be set differently on the basis of a test result or the like measuring how much loss occurs due to the voltage discharge as the blank period begins and the elapsed time reaches each of the plurality of time periods in the blank period.

Meanwhile, the information on the voltage increase/decrease rate for each of the plurality of time periods included in the blank period that is stored in the memory 130 may be information in the form of a lookup table predetermined on the basis of the above-mentioned test result or the like. However, this form is only an example and the information may be implemented in various types of data.

Figure 8:
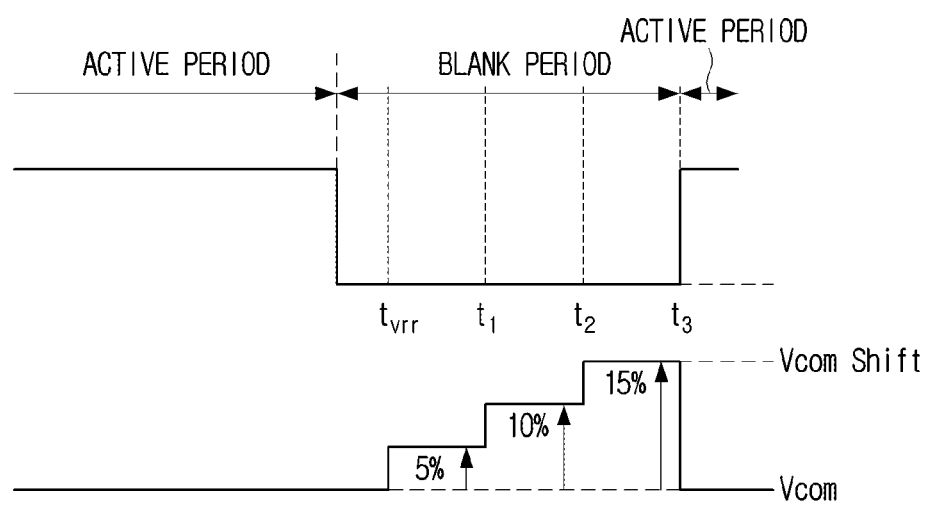
FIG. 8 is a view for explaining a voltage increase rate according to an example embodiment.

FIG. 8 is a view for explaining the voltage increase rate according to an example embodiment.

Referring to FIG. 8, the voltage increase/decrease rate applied to the common voltage may be increased or decreased in proportion to the elapsed time after the threshold time $t_{vrr}$. As described above, the voltage loss due to the voltage distortion of the common electrode may be increased when the blank period becomes longer as the next data signal is not received within the threshold time $t_{vrr}$ after the blank period begins. Therefore, the controller 120 may change the voltage increase/decrease rate applied to the common voltage in proportion to the elapsed time after the threshold time $t_{vrr}$.

Referring to FIG. 8, it may be assumed that the next data signal is received in the third time period $t_3$ after the blank period begins. In this case, the blank period may be defined as a period up to the third time period $t_3$ after the active period.

The controller 120 according to an example embodiment may count the elapsed time on the basis of the reference clock at the same time as the blank period begins, and identify the increase/decrease rate to increase or decrease the common voltage when the counted elapsed time is longer than the threshold time $t_{vrr}$. For example, the controller 120 may apply the increase/decrease rate (for example, 5%) corresponding to the first time period $t_1$ to the common voltage when the counted elapsed time belongs to the first time period $t_1$.

The controller 120 may then apply the increase/decrease rate (for example, 10%) corresponding to the second time period $t_2$ to the common voltage when the elapsed time is longer than the first time period $t_1$ as the blank period is maintained.

The controller 120 may then apply the increase/decrease rate (for example, 15%) corresponding to the third time period $t_3$ to the common voltage when the elapsed time is longer than the second time period $t_2$ as the blank period is maintained. That is, the voltage increase/decrease rate applied to the common voltage may be proportionally increased or decreased when the counted elapsed time is increased as the blank period is maintained. Specific numbers shown in FIGS. 6 to 8 are only examples for convenience of explanation, and the present disclosure is not limited thereto.

Referring to FIGS. 6 to 8, the blank period may end and the active period may begin when the next data signal is received. That is, the controller 120 may provide the data voltage corresponding to the next data signal to the thin film transistor through the data line.

In addition, the controller 120 according to an example embodiment may reset the increase/decrease rate applied to the common voltage when the active period begins as the next data signal is received. For example, the next data signal may be received in a state where the common voltage is increased or decreased as the blank period becomes longer. In this case, the controller 120 may change the common voltage to the common voltage predetermined by a manufacturer (e.g., optimal common voltage based on the frame rate of the display device 100 as shown in FIG. 5). For another example, the increase/decrease rate applied to the common voltage may be reset. In this case, the display device 100 may be initialized to have the common voltage initially set by the manufacturer.

Figure 9:
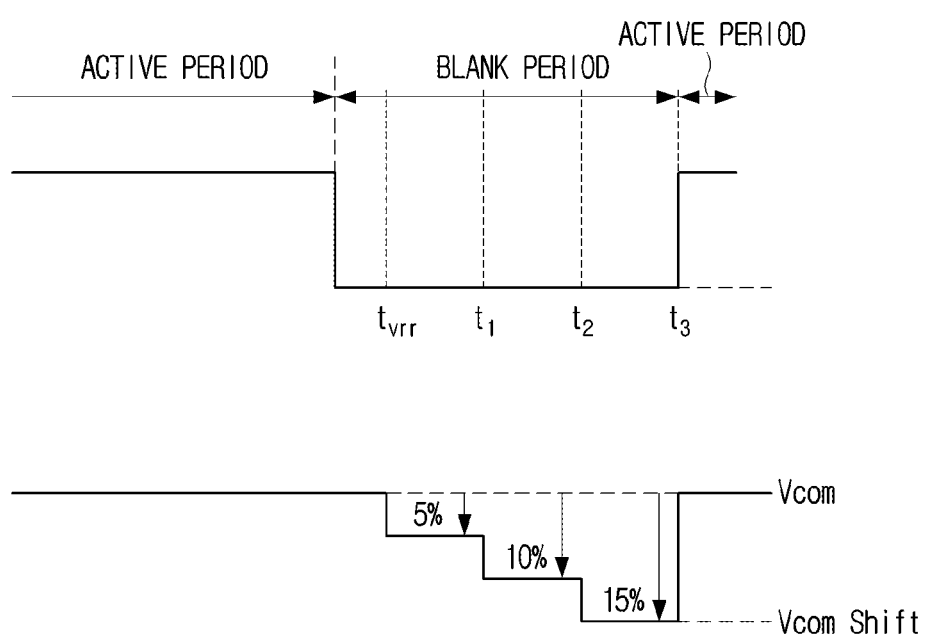
FIG. 9 is a view for explaining a voltage decrease rate according to another example of present disclosure.

FIG. 9 is a view for explaining the voltage decrease rate according to another example.

FIGS. 6 to 8 assume and show only the case where the increase rate corresponding to each time period is obtained to increase the common voltage for convenience of explanation, and vice versa.

In the display device 100 according to various examples, the blank period may not be fixed and may be changed. The data signal may be received past the threshold time after the blank period begins following the active period. In addition, the controller 120 may determine that the frame rate is changed when no data signal is received within the threshold time, and appropriately increase or decrease the common voltage to preserve the voltage loss due to the voltage distortion of the common electrode as the blank period becomes longer.

According to an example embodiment, the display device 100 may be set to have the active period and the optimal common voltage, corresponding to the frame rate of 120 Hz, and the plurality of time periods $t_1$ to $t_3$ included in the blank period may respectively correspond to 80 Hz, 60 Hz, and 48 Hz. This configuration is for convenience of explanation, and the present disclosure is not limited thereto.

According to an example embodiment, the display device 100 may provide the image at a variable frequency of 48 Hz to 120 Hz while minimizing or reducing the lower image quality phenomenon such as the flicker or the afterimage, or grayscale distortion phenomenon by appropriately adjusting the common voltage to secure the voltage loss due to the voltage distortion of the common electrode.

According to various examples, the display device 100 may not be operated only at the fixed frame rate, and may provide the images of various frame rates by appropriately changing the blank period. Accordingly, the display device 100 according to various examples may output the image in compliance with the calculation result (e.g., frame rate of the image) of the calculation device (e.g., graphics card) without the lower image quality such as the flicker or the afterimage, and eliminate the screen tearing by corresponding to the various adaptive synchronization technologies such as AMD's Free Sync™ and Nvidia's G-Sync™.

In addition, an embodiment described above assumes and describes a case where the common electrode is equally connected to each of the liquid crystal capacitor and the holding capacitor. However, the first common electrode may be connected to the liquid crystal capacitor and the second common electrode may be connected to the holding capacitor, respectively. In this case, the controller 120, which comprises processing circuitry, may apply the increase rate corresponding to the elapsed time after the threshold time $t_{vrr}$ to at least one of a voltage of the liquid crystal capacitor based on the first common voltage or a voltage of the holding capacitor based on the second common voltage.

Here, the first common electrode and the second common electrode refer to the different electrodes.

Returning to FIG. 2, a panel driver (not shown) may provide a driving signal to the display panel 110. For example, the panel driver may include the gate driver (not shown), the data driver (not shown), and the common voltage generator (not shown). An example of FIG. 3 describes the panel driving unit as a separate component. However, the controller 120 may also serve as the panel driving unit in another example.

The memory 130 may be electrically connected, directly or indirectly, to the controller 120, and store data required for the various examples. For example, the memory 130 may be implemented as an internal memory included in the processor 130 such as a read only memory (ROM) (e.g., electrically erasable programmable read-only memory (EEPROM)) or a random access memory (RAM), or a memory separate from the processor 130.

The memory 130 may be implemented as a memory embedded in the display device 100, or implemented as a memory detachable from the display device 100, based on a data storage purpose. For example, data for driving the display device 100 may be stored in the memory embedded in the display device 100, and data for an extension function of the display device 100 may be stored in the memory detachable from the display device 100. When implemented as the memory embedded in the display device 100, the memory 130 may be at least one of a volatile memory (e.g., dynamic random access memory (DRAM), static RAM (SRAM), or synchronous dynamic RAM (SDRAM)), or a non-volatile memory (e.g., one time programmable read only memory (OTPROM), programmable ROM (PROM), erasable and programmable ROM (EPROM), electrically erasable and programmable ROM (EEPROM), mask ROM, flash ROM, flash memory (e.g., NAND flash, or NOR flash), hard drive, or solid state drive (SSD)).

When implemented as the memory detachable from the display device 100, the memory 130 may be a memory card (e.g., compact flash (CF), secure digital (SD), micro secure digital (Micro-SD), mini secure digital (Mini-SD), extreme digital (xD), or multi-media card (MMC)), or an external memory (e.g., USB memory) which may be connected to a universal serial bus (USB) port.

In particular, the memory 130 according to an example embodiment may store information on a set value required to drive the display panel 110 at the specific frame rate among the plurality of frame rates.

For example, the memory 120 may store the information on the voltage increase/decrease rate for each of the plurality of frame rates that are different from the specific frame rate.

A user interface (not shown) may be implemented as a device such as a button, a touch pad, a mouse, or a keyboard, or may be implemented as a touch screen, a remote control transceiver, or the like, which may perform the above-described display function and an operation input function together. The remote control transceiver may receive or transmit a remote control signal from an external remote control device through at least one of infrared communication, Bluetooth communication, and Wi-Fi communication.

An output device (not shown) may output a sound signal. For example, the output device may convert a digital sound signal processed by the controller 120 (comprising processing circuitry) into an analog sound signal, amplify the same, and output the amplified sound signal. For example, the output device may include at least one speaker unit, a digital to analog (D/A) converter, an audio amplifier, or the like, which may output at least one channel. For example, the output device may be output various multi-channel sound signals. In this case, the controller 120 may control the output device to enhance-process and output the sound signal input to correspond to the enhancement process of an input image. For example, the controller 120 may convert the input two-channel sound signal into a virtual multi-channel (e.g., 5.1-channel) sound signal, process the corresponding signal into a stereo sound signal optimized for a space by recognizing a position where a display device 100' is placed, or provide an optimized sound signal for a type of input image (e.g., content genre).

The display device 100 may further include a tuner and a demodulator according to an example. The tuner (not shown) may receive a radio frequency (RF) broadcast signal by tuning a channel selected by the user or all pre-stored channels among RF broadcast signals received through an antenna. The demodulator (not shown) may receive and demodulate a digital intermediate frequency (DIF) signal converted by the tuner, and also perform channel decoding or the like. The input image received through the tuner according to an example may be processed through the demodulator (not shown), and then provided to the controller 120 for the image processing according to an example.

Figure 10:
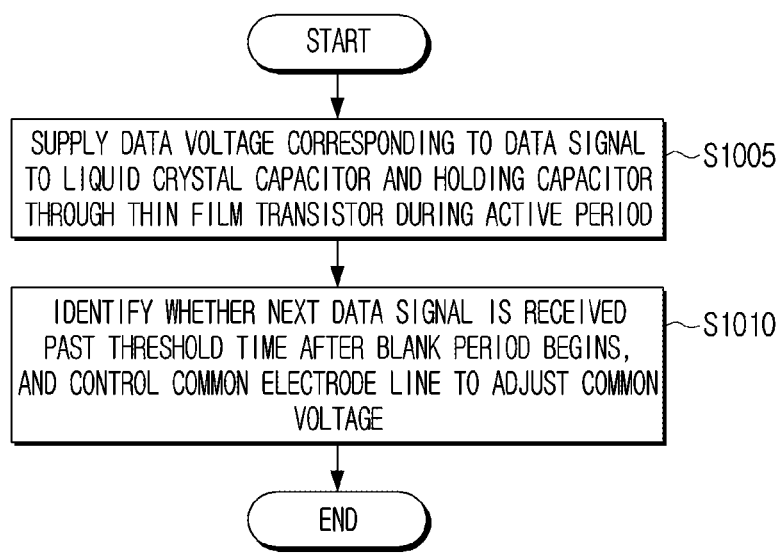
FIG. 10 is a flowchart for explaining a method for controlling a display device according to another embodiment of present disclosure.

FIG. 10 is a flowchart for explaining a method for controlling a display device according to another embodiment.

A method for controlling a display device according to another example embodiment including a thin film transistor positioned at an intersection of a gate line and a data line, and a common electrode line providing a common voltage to a liquid crystal capacitor and a holding capacitor, may first include supplying a data voltage corresponding to a data signal to the liquid crystal capacitor and holding capacitor through the thin film transistor during an active period (S1005). The method may then include identifying whether a next data signal is received past a threshold time after a blank period begins, and controlling the common electrode line to adjust the common voltage on the basis of an identification result (S1010).

The controlling of the common electrode line (S1010) according to another embodiment may include counting an elapsed time on the basis of a reference clock when the blank period begins, and controlling the common electrode line to adjust the common voltage on the basis of the counted elapsed time when the counted elapsed time is longer than the threshold time.

According to another embodiment, the display device may include information on a voltage increase/decrease rate for each of a plurality of time periods included in the blank period, and the controlling of the common electrode line (S1010) may include obtaining a first increase/decrease rate corresponding to a first time period when the counted elapsed time belongs to the first time period among the plurality of time periods, and adjusting the common voltage by applying the obtained first increase/decrease rate to the common voltage.

The controlling of the common electrode line (S1010) according to another embodiment may include obtaining a second increase/decrease rate corresponding to a second time period when the counted elapsed time belongs to a second time period among the plurality of time periods as the blank period is maintained, and applying the second increase/decrease rate to the adjusted common voltage.

Here, the voltage increase/decrease rate applied to the common voltage may be increased or decreased in proportion to the elapsed time.

The controlling method according to another embodiment may further include supplying the data voltage corresponding to the next data signal to the thin film transistor through the data line when the next data signal is received, and resetting the increase/decrease rate applied to the common voltage.

The controlling of the common electrode line (S1010) according to another embodiment may include maintaining the common voltage when the next data signal is received within the threshold time, in which the threshold time is determined on the basis of a frame rate of the display device.

The controlling of the common electrode line (S1010) according to another embodiment may include adjusting at least one of a voltage of the liquid crystal capacitor based on a first common voltage or a voltage of the holding capacitor based on a second common voltage on the basis of the identification result.

According to another example embodiment, charges accumulated in the liquid crystal capacitor and holding capacitor may be discharged by voltage loss due to distortion of the common voltage and a leakage characteristic of the thin film transistor during the blank period.

However, the various embodiments of the present disclosure may be applied to all electronic devices which may perform image processing, such as an image receiving device such as a set-top box and an image processing device, as well as the display device.

Meanwhile, the various embodiments of the present disclosure described above may be implemented in a computer or a computer-readable recording medium using software, hardware, or a combination of software and hardware. In some cases, the embodiments described in the present disclosure may be implemented by the processor itself. According to a software implementation, the embodiments such as procedures and functions described in the specification may be implemented by separate software modules. Each of the software modules may perform one or more functions and operations described in the specification.

Meanwhile, computer instructions for performing processing operations of the sound output device 100 according to the various embodiments described above may be stored in a non-transitory computer-readable medium. The computer instructions stored in the non-transitory computer-readable medium allow a specific device to perform the processing operations of the sound output device 100 according to the various embodiments described above when the instructions are executed by a processor of the specific device.

The non-transitory computer-readable medium is not a medium that stores data therein for a while, such as a register, a cache, or a memory, and indicates a medium that semi-permanently stores data therein and is readable by the machine. A specific example of the non-transitory computer-readable medium may include a compact disk (CD), a digital versatile disk (DVD), a hard disk, a Blu-ray disk, a universal serial bus (USB), a memory card, a read-only memory (ROM), or the like.

Although the embodiments are shown and described in the present disclosure as above, the present disclosure is not limited to the above-mentioned specific embodiments, and may be variously modified by those skilled in the art to which the present disclosure pertains without departing from the gist of the present disclosure as claimed in the accompanying claims. These modifications should also be understood to fall within the scope and spirit of the present disclosure. It will also be understood that each embodiment herein may be used in combination with any other embodiment(s) described herein.

What is claimed is:

1. A display device comprising:
a thin film transistor operatively associated with a gate line and a data line;
a common electrode line for providing a common voltage to a liquid crystal capacitor and a holding capacitor; and
a controller configured to supply a data voltage corresponding to a data signal to the liquid crystal capacitor and the holding capacitor via at least the thin film transistor during an active period,
wherein the controller is configured to identify whether a next data signal is received past a threshold time after a blank period begins, and
the controller is configured to control the common electrode line to adjust the common voltage based on whether the next data signal is received past the threshold time after the blank period begins.

2. The device of claim 1, wherein the controller is configured to count an elapsed time based on a reference clock when the blank period begins, and
the controller is configured to control the common electrode line to adjust the common voltage based on the counted elapsed time when the counted elapsed time is longer than the threshold time.

3. The device of claim 2, further comprising a memory for storing information on a voltage increase/decrease rate for each of a plurality of time periods included in the blank period,
wherein the controller is configured to obtain a first increase/decrease rate corresponding to a first time period when the counted elapsed time belongs to the first time period among the plurality of time periods, and
to adjust the common voltage by applying the obtained first increase/decrease rate to the common voltage.

4. The device of claim 3, wherein the controller is configured to obtain a second increase/decrease rate corresponding to a second time period when the counted elapsed time belongs to the second time period among the plurality of time periods as the blank period is maintained, and
to apply the second increase/decrease rate to the adjusted common voltage.

5. The device of claim 4, wherein the controller is configured so that voltage increase/decrease rate applied to the common voltage is increased and/or decreased in proportion to the elapsed time.

6. The device of claim 4, wherein the controller is configured to supply the data voltage corresponding to the next data signal to the liquid crystal capacitor and the holding capacitor through the thin film transistor when the next data signal is received, and
to reset the increase/decrease rate applied to the common voltage.

7. The device of claim 1, wherein the controller is configured to maintain the common voltage when the next data signal is received within the threshold time, and
the threshold time is to be determined based on a frame rate of the display device.

8. The device of claim 1, wherein the controller is configured to adjust at least one of a voltage of the liquid crystal capacitor based on a first common voltage, or a voltage of the holding capacitor based on a second common voltage on the basis of the identification result.

9. The device of claim 1, wherein charges accumulated in the liquid crystal capacitor and holding capacitor are to be discharged by voltage loss due to distortion of the common voltage and a leakage characteristic of the thin film transistor during the blank period.

10. A method for controlling a display device including a thin film transistor operative associated with a gate line and a data line, and a common electrode line providing a common voltage to a liquid crystal capacitor and a holding capacitor, the method comprising:
supplying a data voltage corresponding to a data signal to the liquid crystal capacitor and the holding capacitor through at least the thin film transistor during an active period; and identifying whether a next data signal is received past a threshold time after a blank period begins, and controlling the common electrode line to adjust the common voltage based on whether the next data signal is received past the threshold time after the blank period begins.

11. The method of claim 10, wherein the controlling of the common electrode line includes:

counting an elapsed time based on a reference clock when the blank period begins; and controlling the common electrode line to adjust the common voltage based on the counted elapsed time when the counted elapsed time is longer than the threshold time.

12. The method of claim 11, wherein the display device includes information on a voltage increase/decrease rate for each of a plurality of time periods included in the blank period, and the controlling of the common electrode line includes:

obtaining a first increase/decrease rate corresponding to a first time period when the counted elapsed time belongs to the first time period among the plurality of time periods; and adjusting the common voltage by applying the obtained first increase/decrease rate to the common voltage.

13. The method of claim 12, wherein the controlling of the common electrode line includes:

obtaining a second increase/decrease rate corresponding to a second time period when the counted elapsed time belongs to the second time period among the plurality of time periods as the blank period is maintained; and applying the second increase/decrease rate to the adjusted common voltage.

14. The method of claim 13, wherein the voltage increase/decrease rate applied to the common voltage is increased and/or decreased in proportion to the elapsed time.

15. The method of claim 13, further comprising:

supplying the data voltage corresponding to the next data signal to the thin film transistor through the data line when the next data signal is received; and resetting the increase/decrease rate applied to the common voltage.

16. The method of claim 10, wherein the controlling the common electrode line further comprises:

maintaining the common voltage when the next data signal is received within the threshold time, and the threshold time is to be determined based on a frame rate of the display device.

17. The method of claim 10, wherein the controlling the common electrode line further comprises:

adjusting at least one of a voltage of the liquid crystal capacitor based on a first common voltage, or a voltage of the holding capacitor based on a second common voltage on the basis of the identification result.

18. The method of claim 10, wherein charges accumulated in the liquid crystal capacitor and holding capacitor are to be discharged by voltage loss due to distortion of the common voltage and a leakage characteristic of the thin film transistor during the blank period.

* * * * *